United States Patent
Schuepbach

(10) Patent No.: US 7,372,922 B2
(45) Date of Patent: May 13, 2008

(54) RSSE OPTIMIZATION USING HARDWARE ACCELERATION

(75) Inventor: Olivier Charles Schuepbach, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 617 days.

(21) Appl. No.: 10/631,095

(22) Filed: Jul. 31, 2003

(65) Prior Publication Data

US 2004/0128334 A1    Jul. 1, 2004

(30) Foreign Application Priority Data

Dec. 18, 2002    (EP) ................... 02293152

(51) Int. Cl.
*H03D 1/00* (2006.01)
(52) U.S. Cl. ................... 375/341; 375/262
(58) Field of Classification Search .............. 375/233, 375/262, 265, 267, 341; 708/603
See application file for complete search history.

(56) References Cited

U.S. PATENT DOCUMENTS

| | | | | |
|---|---|---|---|---|
| 6,163,581 A * | 12/2000 | Kang | ................... | 375/341 |
| 6,397,240 B1 * | 5/2002 | Fernando et al. | ........... | 708/603 |
| 6,707,849 B1 * | 3/2004 | Zangi et al. | ................. | 375/233 |
| 6,970,520 B1 * | 11/2005 | Lindbom et al. | ........... | 375/340 |
| 7,116,732 B2 * | 10/2006 | Worm et al. | ................ | 375/341 |
| 2002/0056068 A1 * | 5/2002 | Aymar et al. | ................ | 714/795 |
| 2002/0122507 A1 * | 9/2002 | Eidson | ........................ | 375/340 |
| 2002/0162074 A1 * | 10/2002 | Bickerstaff | .................. | 714/792 |

FOREIGN PATENT DOCUMENTS

| | | |
|---|---|---|
| EP | 0 786 872 A2 | 7/1997 |
| EP | 1 058 392 A1 | 12/2000 |
| WO | WO 01/03308 A1 | 1/2001 |
| WO | WO 01/60002 A1 | 1/2001 |
| WO | WO 02/39689 A2 | 5/2001 |
| WO | WO 0178239 A2 | 10/2001 |

OTHER PUBLICATIONS

"Error Probablility of Reduced State Sequence Estimation for Trellis-Coded Modulation on Intersymbol Interference Channels", Wern Ho Sheen, et al., IEEE Global Telecommunications Conference, Dec. 2-5, 1991, pp. 1159-1164, XP010042585, New York, US.
"Reduced-Complexity Viterbi Detector Architectures for Partial Response Signalling", Gerhard Fettweis, et al., IEEE Global Telecommunications Conference, Nov. 14-16, 1995, pp. 559-563, XP000621547, New York, US.
"Digital Communications", J. G. Proakis, McGraw-Hill, 1995, pp. 249-254, 468-470, 621-627, 649-654, 698-702, 729-732, and 797-806, XP002202678, New York, US, ISBN: 0-07-113814-5.

* cited by examiner

*Primary Examiner*—Emmanuel Bayard
(74) *Attorney, Agent, or Firm*—Ronald O. Neerings; Wade J. Brady, III; Frederick J. Telecky, Jr.

(57) ABSTRACT

A Reduced State Sequence Equalizer (RSSE) is implemented using a butterfly hardware accelerator (58) in the form of a butterfly to increase the efficiency of computing branch metrics (24) and the ACS (add, compare and select) function (26). Multiple path metrics between a first state and a second state may be computed responsive to the received symbols and reference constellation symbols and determining a best scenario at the second state using said butterfly circuitry. The received symbols may be rotated by a predetermined angle for computation of all minimums of two cosets in an 8-PSK constellation.

10 Claims, 5 Drawing Sheets

RSSE OPTIMIZATION USING HARDWARE ACCELERATION

This application claims priority under 35 USC §119(e)(1) of European Patent Application Number 02293152.1 filed Dec. 18, 2002.

CROSS-REFERENCE To RELATED APPLICATIONS

Not Applicable

STATEMENT OF FEDERALLY SPONSORED RESEARCH OR DEVELOPMENT

Not Applicable

BACKGROUND OF THE INVENTION

1. Technical Field

This invention relates in general to communications and, more particularly, to a method and apparatus for optimizing RSSE calculations.

2. Description of the Related Art

Compared to binary modulation commonly used in 2G standards, advanced wireless communication systems may use high-level modulation schemes. From a system point of view, this results in spectral efficiency at the expense of an increase of Inter-Symbol Interference (ISI).

In order to mitigate ISI, efficient equalizers need to be implemented on the receiver side. The optimal solution to this problem is known as Maximum Likelihood Sequence Estimation (MLSE). The goal of this method is to subtract every possible sequence of L constellation points weighted by the channel estimation factors from the received symbol vector in order to determine the most probable symbols. L corresponds to the channel estimation length.

The concept behind MLSE is to choose the minimum error square between the received symbol $y_k$ and every possible linear combination of the last L symbols $\hat{a}_{k-i}$ weighted by the channel response samples $h_i$, all values being complex. In a mathematical form, the approximated symbol frame of length $L_{frame}$ is given by:

$$\underline{\hat{a}} = \arg\left\{\min_{\underline{a}} \sum_{k=0}^{L_{frame}-1} \left(\left\|y_k - \sum_{i=0}^{L-1} h_i \hat{a}_{k-i}(s)\right\|^2\right)\right\}$$

This inner term of the equation, the branch metric, can be rewritten as:

$$\left\|y_k - \sum_{i=1}^{L-1} h_i \hat{a}_{k-i}(s) - h_0 \hat{a}_k(s)\right\|^2$$

The branch metric (bm) is composed by three terms. The first one is the soft value of the received symbol, the second one is the estimated contribution of the ISI coming from the L-1 preceding symbols and the third one is the supposed received symbol multiplied by a channel coefficient.

The $\hat{a}_{k-i}(s)$ for $i=1, \ldots, L-1$ fully determine a state of the MLSE in a trellis representation. Thus, the number of possible combinations or states, taking into account that $\hat{a}_{k-i}(s)$ belongs to a set of M symbols and that $K=L-1$ with the channel response being of length L, is equal to $M^K$. Furthermore, M transitions output each state. This makes MLSE too complicated for implementation in terminals receivers.

A more adapted method, the Reduced State Sequence Equalizer (RSSE) is derived from MLSE. The simplification lies in the reduction of the number of states. Like for the MLSE, the RSSE method consists in minimizing a sum of square values (branch metrics) among all the symbols of the frame under consideration. Therefore, a trellis structure is well adapted to carry out this task. Compared to convolutional decoding, there are, for the general case, no redundancy properties among the branch metrics.

For each symbol received, i.e. on trellis transition, the following units are executed: (1) Branch Metric Computation (BMC) Unit: Compute individually one branch metric per transition, (2) Add Compare and Select (ACS) Unit. With more than two transitions per state and (3) Post-Processing. Current implementations do not use generic structure to perform the BMC and ACS functions. Each branch metric is computed, added to the previous state value and the minimum path is selected for all next states.

While RSSE requires only a fraction of calculations required by MLSE, it still is computation intensive, using significant processing resources. Therefore, a need has arisen for a method and apparatus for performing RSSE computations efficiently.

BRIEF SUMMARY OF THE INVENTION

In the present invention, a sequence of probable symbols is generated from a sequence of received symbols using Reduced State Sequence Estimation. Butterfly circuitry computes terms $sm_1'=\min\{sm_1+m, sm_2-m\}$ and $sm_2'=\min\{sm_1-m, sm_2+m\}$. Path metrics are computed between a first state and a second state responsive to the received symbols and reference constellation symbols and a best scenario path is determined at the second state using said butterfly circuitry.

The present invention allows branch metric and the accumulate, compare and select (ACS) functions to be aided by use of a butterfly hardware accelerator available to support Viterbi decoding.

BRIEF DESCRIPTION OF THE SEVERAL VIEWS OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

The present invention is best understood in relation to FIGS. 1-8 of the drawings, like numerals being used for like elements of the various drawings.

The Reduced State Sequence Equalizer (RSSE) is derived from the MLSE. In its most complicated form, it is equivalent to the MLSE and in its most simplified form to the DFE (Decision Feedback Equalization). Thus, its complexity is comprised between the MLSE complexity and the DFE complexity.

The RSSE principle restricts the number of possible combination of past symbols to be tested by regrouping them inside so-called cosets. A coset is a collection of one or more symbols of the signal set. All symbols of the constellation need to be in one and only one coset. The $i^{th}$ coset at time n-k is represented by $A_i(k)$. $J_{k-i}$ is the number of cosets at time n-k and is naturally comprised between 1 and the number of symbols of the signal set: $1 \leq J_k \leq M$ for $\forall k$. Furthermore, the analysis here below is restricted to values of $J_k$ equal to power of 2, e.g. for a 8-PSK constellation we have $J_k \in [1,2,4,8]$, and decreasing or equal values of $J_k$ for increasing values of k: $J_k \leq J_{k-1}$. This last restriction means that the older the symbol of the ISI sum, the less cosets at that time.

FIGS. 1*a-d* illustrates four different possible cosets for 8-PSK modulation. As stated above, the idea behind the RSST is to reduce the number of states of the MLSE. Thus, while a MLSE implementation would have $M^K$ states, the RSSE implementation would have $$\prod_{k=0}^{L-2} J_k$$

states, where $$1 \leq \prod_{k=0}^{L-2} J_k \leq M^K,$$

while both the MLSE and RSSE implementation have M branch metrics outputting every state. In the RSSE, the number of states is given by $$\prod_k J_k.$$

In the MLSE, $J_k$ is always equal to the number M of symbols in the constellation.

The RSSE selects the best symbol sequence by minimizing the sum of each Square Euclidean Distance of the estimated ISI term subtracted from the received samples. At each transition, each previous state issues branch metrics related to every symbol $a^i$ belonging to the reference constellation that reach the next states where the symbol is contained in the coset $A_j$.

Figure 1A:
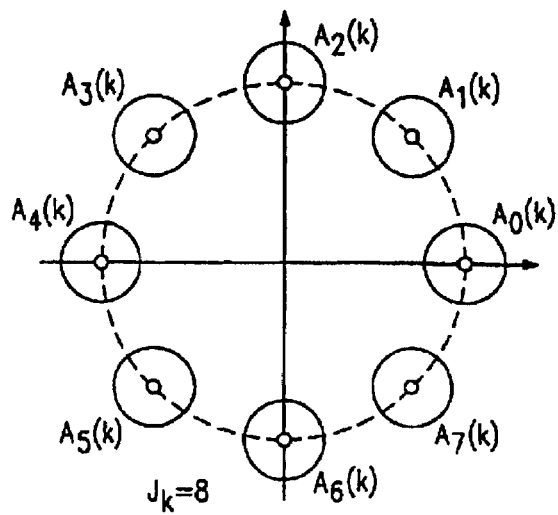
FIGS. 1a-d illustrate four different possible cosets for 8PSK modulation.
Figure 1B:
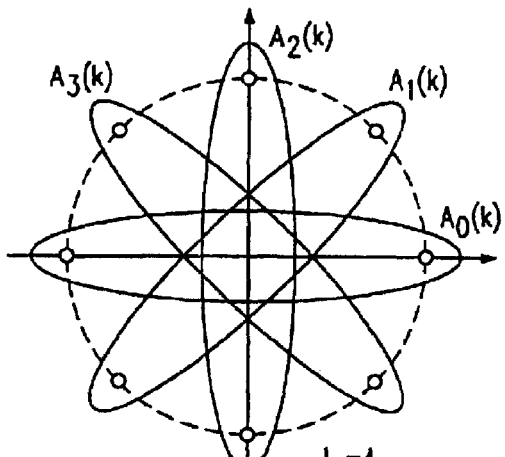
Figure 1C:
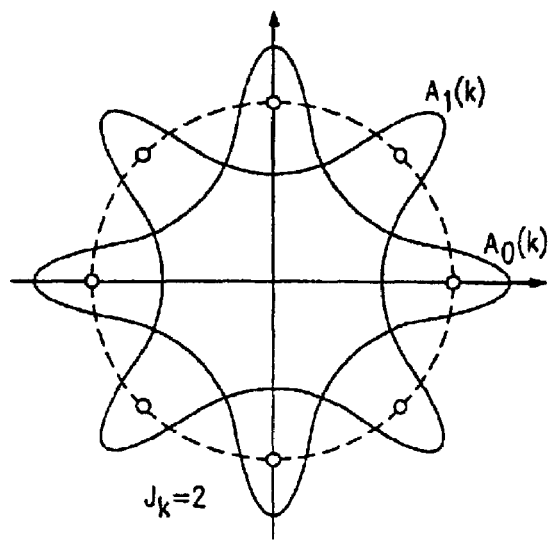
Figure 1D:
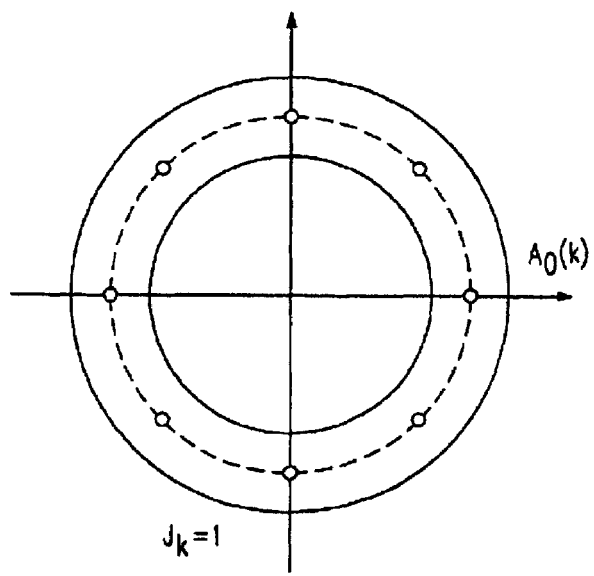
Figure 2:
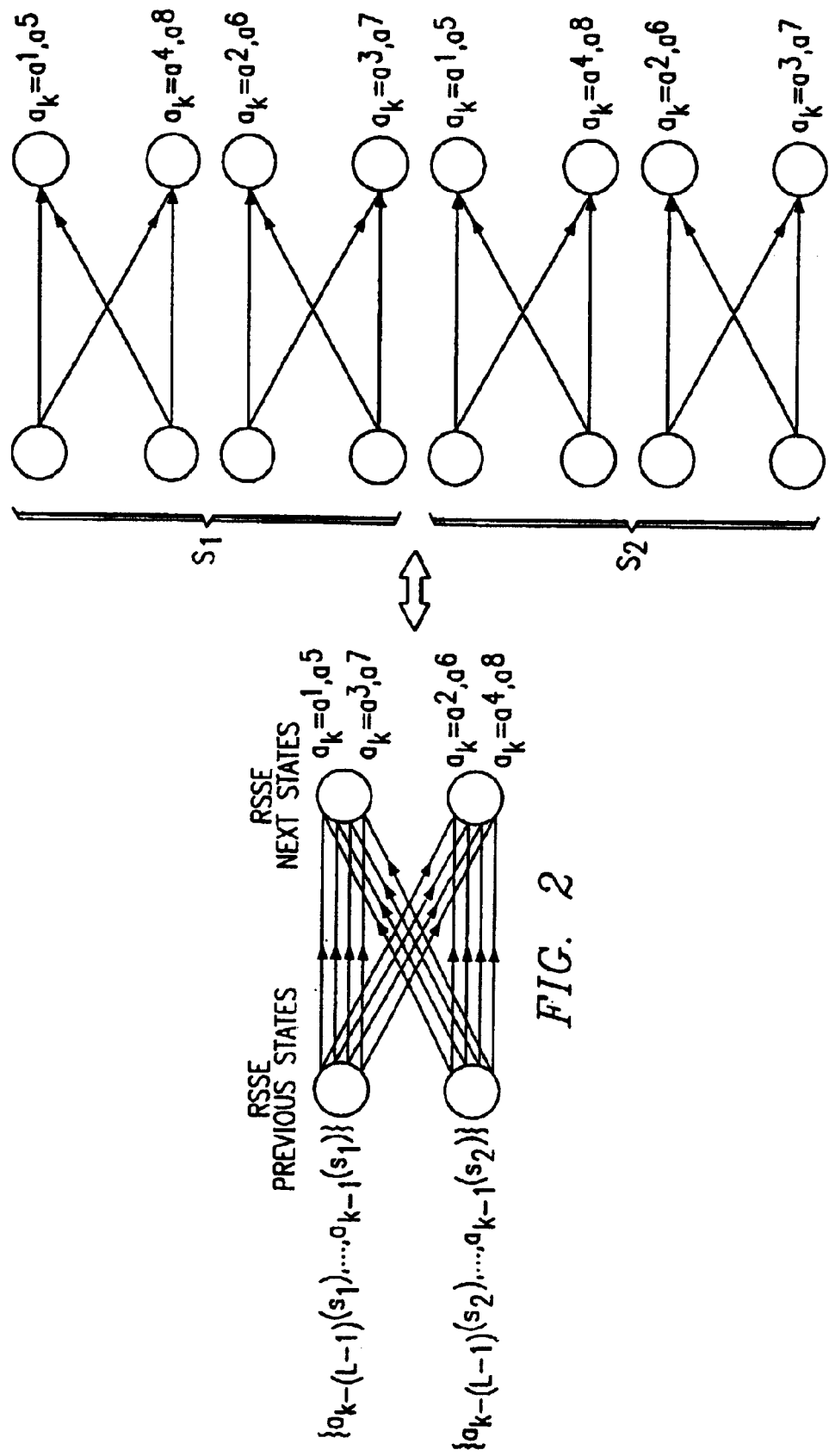
FIG. 2 illustrates a trellis structure for an 8PSK 2-state RSSE and its decomposed version for butterfly execution.
Figure 3:
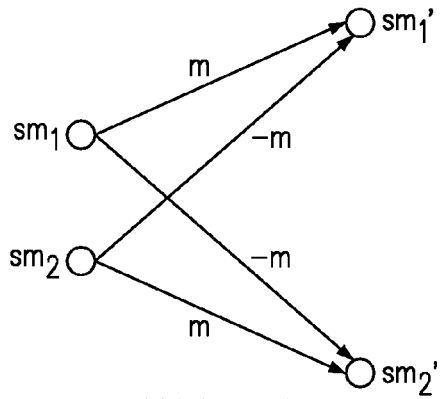
FIG. 3 illustrates a butterfly structure.

FIG. 2 illustrates a trellis structure for an 8PSK 2-state RSSE. One sees that in FIG. 2, the number of states is smaller than the number of branches per state and thus parallel transitions occur (four per state transition).

The branch metric between states is $$b_m(s, \hat{a}_k) = \left\| y_k - \sum_{i=0}^{L-1} h_i \hat{a}_{k-i}(s) - f(s) \right\|^2,$$

where f(s) may include any corrective terms to compensate for the reduced symbol set.

Many digital signal processors include one or more hardware accelerators (HWAs). A possible HWA is the butterfly-HWA for trellis calculations in Viterbi decoding. The butterfly structure is shown functionally in FIG. 3. The butterfly structure computes:

$$sm_1' = \min\{sm_1+m, sm_2-m\} \text{ and}$$

$$sm_2' = \min\{sm_1-m, sm_2+m\}$$

Hardware accelerators can be of a number of different varieties. In some cases, the HWA can be implemented as a specific instruction that is an extension of the ISA (Instruction Set Architecture) which executes a complex function. The hardware that supports the instruction may be part of the processing core or coupled to the processing core. There may also be variations on the computations shown above.

For purposes of discussion, it will be assumed that the butterfly structure has the following restrictions: (1) the branch metrics of a butterfly are symmetric, (2) the branch metrics entering a state are of opposite sign and (3) the branch metrics are real values. Thus, the branch metric has to be a linear function for at least the part containing the parameter corresponding to the bm (the symbol for the equalizer). If not, the structure behind the HWA may not be fully used.

Figure 4:
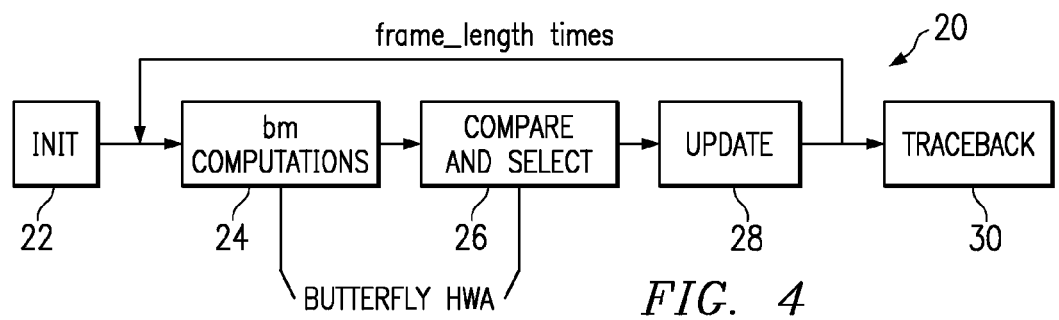
FIG. 4 illustrates a block diagram showing the operation of an RSSE equalizer improved by hardware acceleration.

FIG. 4 illustrates a block diagram 20 showing the operation of the RSSE equalizer, indicating areas, which can be improved by the butterfly structure hardware. In block 22, parameters and trellis metrics initialization is performed. In block 24, the branch metrics are computed, using the benefit of acceleration from the butterfly structure. These operations are described in greater detail below. In block 26, the compare and select at the next states are performed, again with the benefit of the butterfly structure. In block 28, the different parameters are updated for computation of the following symbol. The loop of blocks 24 through 28: is repeated for a frame length. Upon completion of a frame, the traceback occurs in block 30 to determine the most likely sequence of symbols.

The following describes modification of the general RSSE methods to allow use of the butterfly structure. As described above:

$$bm(s, \hat{a}_k) = \left\| y_k - \sum_{i=0}^{L-1} h_i \hat{a}_{k-i}(s) - f(s) \right\|^2$$

The equation can be rewritten as:

$$bm(s, \hat{a}_k) = \left\| y_k - \sum_{i=1}^{L-1} h_i \hat{a}_{k-i}(s) - h_0 \hat{a}_k - f(s) \right\|^2 = \| \underline{S} - h_0 \hat{a}_k \|^2$$

with $\underline{S} = \left[ y_k - \sum_{i=1}^{L-1} h_i \hat{a}_{k-i}(s) - f(s) \right]$.

Thus, $bm(s, \hat{a}_k) = \|\underline{S} - h_0\hat{a}_k\|^2 = \|\underline{S}\|^2 + \|h_0\hat{a}_k\|^2 - 2\text{Re}\{h_0\hat{a}_k\underline{S}^*\}$. Without loss of generality, we can set the coefficient $h_0=1$ and for 8PSK constellation $\|a_k\|^2$ is equal to 1. Consequently, $bm(s,\hat{a}_k) = \|\underline{S}\|^2 - 2Re[h_0\hat{a}_k\underline{S}^*]$.

For a given state, the $\|\underline{S}\|^2$ is constant. Differences come from the targeted symbol $\hat{a}_k$. The branch metric can be decomposed further by inserting the real and imaginary parts of the right terms: $\hat{a}_k = a_x + j \cdot a_y$, $h_0 = h_x + j \cdot h_y$, and $\underline{S} = S_x + j \cdot S_y$. Thus:

$bm(s,\hat{a}_k) = \|\underline{S}\|^2 - 2[a_x(h_xS_x + h_yS_y) + a_y(h_xS_y - h_yS_x)]$, or more concisely:

$bm(s,\hat{a}_k) = \|\underline{S}\|^2 - 2[a_x Re\{h_0^*\underline{S}\} + a_y Im\{h_0^*\underline{S}\}]$ Taking into account that h and $\underline{S}$ are related to the initiating state and not to the symbol, the equation can be rewritten as:

$bm(s, \hat{a}_k) = \|\underline{S}\|^2 - 2[a_x(s) + a_y(s)] = \|\underline{S}\|^2 - 2a_x(s)$, with $a_x(s) = a_x Re\{h_0^*\underline{S}\}$ and $a_y(s) = a_y Im\{h_0^*\underline{S}\}$.

Examining this expression, it can be seen that the branch metric is composed by three terms, the first one is equal for every branch coming out of one state, the second and third are linear combinations of $h_0$, the $\underline{S}$ term (both determined by the state) and respectively the real and the imaginary parts of the symbol under consideration.

All the terms depend on the initiating state s. This excludes any use of a butterfly structure with two different states (since the butterfly structure has a m, -m,-m, m symmetry relation). Thus, the only solution is to use one butterfly to compute four transitions issued from one state. This would represent two butterflies per RSSE initiating state for an 8-PSK Constellation.

The RSSE applied to the 8PSK constellation, as defined in FIG. 1a-d, has an interesting property: each coset with more than one symbol always has a symbol and its opposite. This is easily understandable by looking at FIGS. 1a-d. Furthermore, the 4 diagonal symbols (the ones in the coset $A_1(k)$ in FIG. 1c) have coordinates equal to $(\pm u, \pm u)$ where $u = \cos(\pi/4)$. As shown above, the branch metric may be decomposed in three terms with the two last terms being a linear function of the real and imaginary parts of the symbol under consideration. This second property allows use of the butterfly by conceptually changing the notion of bm for the equalizer. The constant part $\|\underline{S}\|^2$ of the RSSE bm and the positive or negative version of $2a_x(s)$ are added to the old state value in order to define two Trellis states. The branch metric is equal to $2a_y(s)$.

As shown graphically in FIG. 5, the Butterfly structure can be used to compute branch metrics by setting the butterfly HWA values as follows:

$sm_1 = sm_{old} + \|\underline{S}\|^2 - 2a_x(s)$ $sm_2 = sm_{old} + \|\underline{S}\|^2 + 2a_x(s)$ $m = 2a_y(s)$ The butterfly structure computes the transition corresponding to four diagonal symbols of the 8PSK constellation by adding and subtracting their real and imaginary components. The minimum of the two branch metrics determines the best symbol for each coset. It should be noted however, that in this form the butterfly structure is applicable only to cosets that have the symbols with coordinates $(\pm a_x, \pm a_y)$, $a_x$ and $a_y$ being two real numbers.

Figure 5:
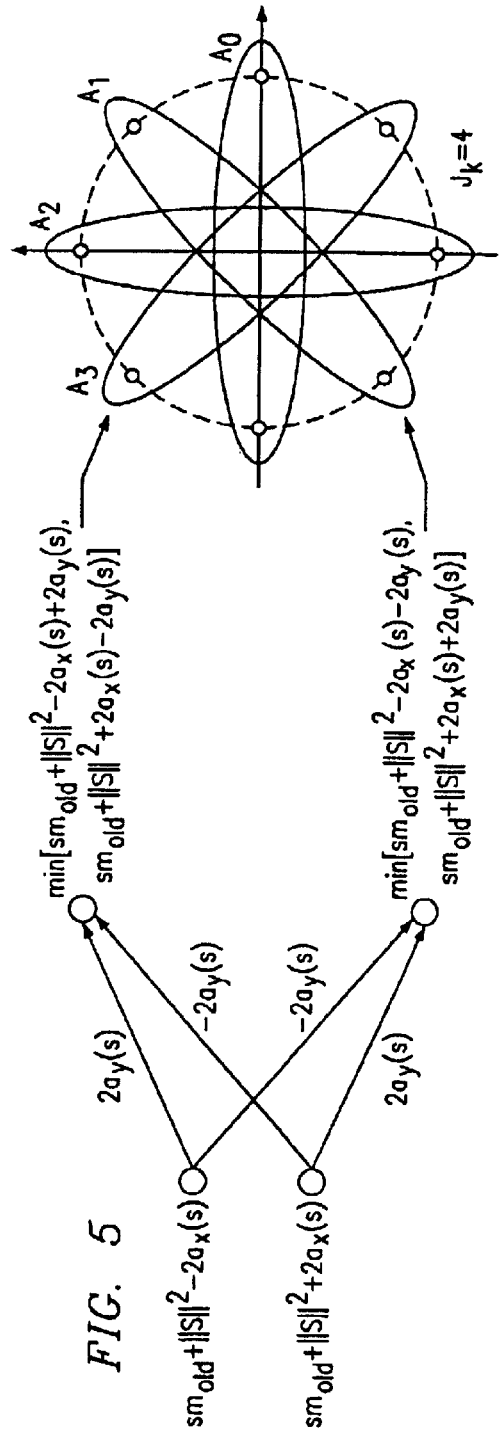
FIG. 5 illustrates how a Butterfly structure can be used to compute branch metrics.

Also as shown in FIG. 5, in this form, only the two diagonal cosets can be computed by the butterfly structure.

Figure 6:
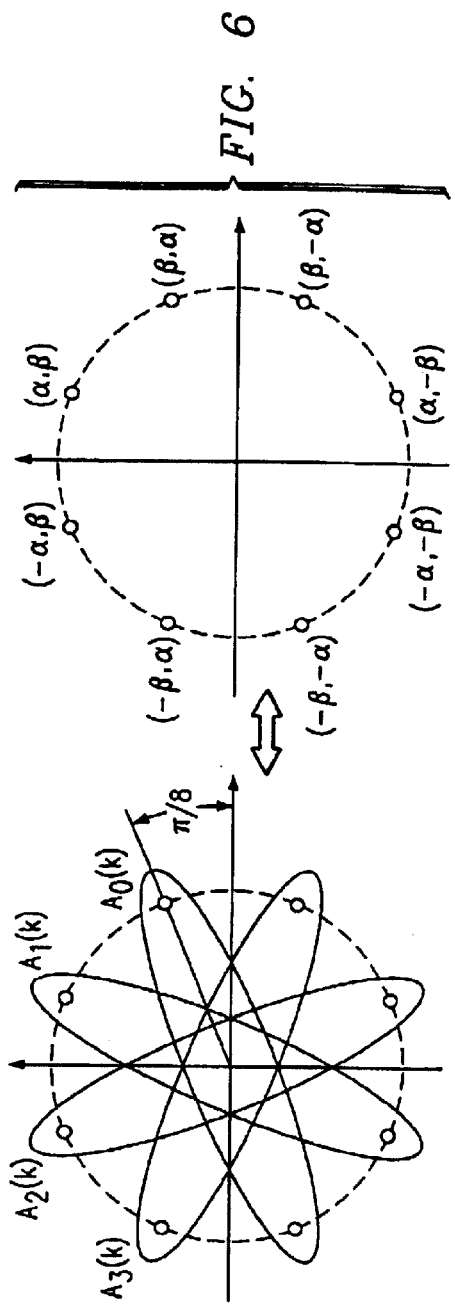
FIG. 6 illustrates a π/8 counterclockwise rotation of a 8PSK constellation to produce symbols which can be accelerated by a Butterfly structure.

A way to use the butterfly structure for the computation of all minimums of two value cosets in 8-PSK constellations is to operate a change of referential. The role of the equalizer is to produce hard decisions. A change of referential will therefore not affect the other parts of the DBB (digital baseband). A $\pi/8$ counterclockwise rotation of the constellation shows interesting properties concerning the 8-PSK constellation symbols. As shown in FIG. 6, a $\pi/8$ counterclockwise rotation produces symbols that are determined by only two real values $\alpha$ and $\beta$.

Figure 7:
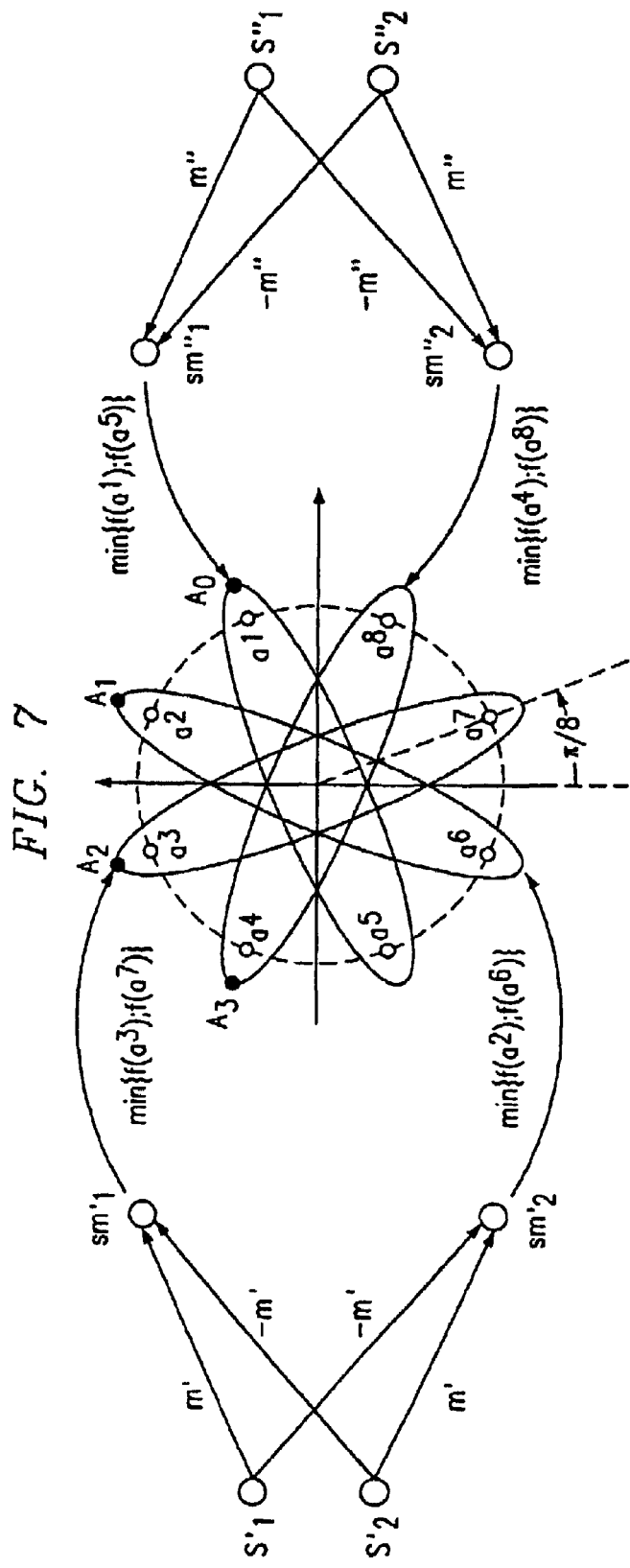
FIG. 7 illustrates how 2 Butterfly structures can be used to compute branch metrics relative to all constellation symbols of the rotated 8-PSK constellation.

After the rotation, there are two, four-symbol groups ($\{A_0(k), A_3(k)\}$ and $\{A_1(k), A_2(k)\}$) that fulfill butterfly conditions exposed above. Thus, the butterfly structure can be used for all transitions and minimum computations in such a configuration as shown in FIG. 7.

Using a $\pi/8$ counterclockwise rotation (any rotation of $(2k+1)*\pi/8$, where k is an integer can be used), the butterfly HWA can be applied with the following values:

For the first butterfly of symbol groups $\{A_0(k), A_3(k)\}$:

$a_x(s) = \beta Re\{h_0^*\underline{S}\}$ and $a_y(s) = \alpha Im\{h_0^*\underline{S}\}$ $sm_1 = sm_{old} + \|\underline{S}\|^2 - 2\beta Re\{h^*\underline{S}\}$ $sm_2 = sm_{old} + \|\underline{S}\|^2 + 2\beta Re\{h^*\underline{S}\}$ $m = 2\alpha Im\{h^*\underline{S}\}$ For the second butterfly of symbol groups $\{A_1(k), A_2(k)\}$ $a_x(s) = \alpha Re\{h_0^*\underline{S}\}$ and $a_y(s) = \beta Im\{h_0^*\underline{S}\}$ $sm_1 = sm_{old} + \|\underline{S}\|^2 - 2\alpha Re\{h^*\underline{S}\}$ $sm_2 = sm_{old} + \|\underline{S}\|^2 + 2\alpha Re\{h^*\underline{S}\}$ $m = 2\beta Im\{h^*\underline{S}\}$ with $\alpha = \cos(\pi/8)$, $\beta = \sin(\pi/8)$ and $Re\{h^*\underline{S}\} = h_xS_x + h_yS_y$ and $Im\{h^*\underline{S}\} = h_xS_y - h_y$ A pseudo-code implementation for a modified 8PSK 2-state RSSE method is provided below:

```
Initialize (Rotation of y_n, h_k)
Repeat L times {
    For each RSSE state (2 times) {
        Compute S and ‖S‖².
        Compute h*S Re{} and Im{}.
        For each butterfly (2 times) {
            Compute sm_1 and sm_2
            Compute bm
        }
    }
    Perform 8 Butterflies.
    Update. } End repeat L times
Traceback (TBD)
```

The $\pi/8$ rotation method has some implications: (1) $\pi/8$ rotation of received samples $y_i$, (2) $\pi/8$ rotation of channel estimation $h_k$ and (3) only applicable when $J_k \leq M/2$ and when the constellation coset have symbols of opposite signs.

Using a butterfly structure in the RSSE method can significantly reduce the computing resources needed for RSSE calculations, while having no effect on the performance of the RSSE function.

It should also be noted that the RSSE method described above could be used in either a loss-less or a loss variation. In the loss-less variation, both y (received symbol sample vector) and reference constellation symbols are rotated by angle equal to $(2k+1)*\pi/8$ with k being a whole number. The angle may vary depending upon the number of symbols in the constellation.

In the loss variation, both y (received symbol sample vector) and reference constellation symbols are rotated by angle equal to $(2k+1)*\pi/8$. Then, either the reference constellation or y is rotated by an angle a bit higher or a bit smaller than the first one. The error is proportional to the absolute difference of the rotation angle between y and the reference constellation symbols.

Figure 8:
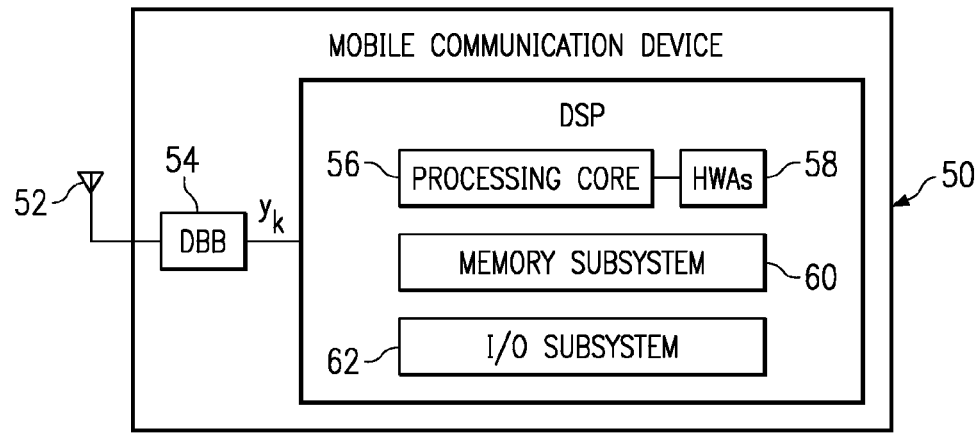
FIG. 8 illustrates a block diagram of a mobile communication device using a DSP with the accelerated RSSE.

FIG. 8 illustrates a block diagram of a mobile communication device 50 using a DSP 60 for communications support. Information is received over antenna 52, which is converted to symbols $y_k$ by digital baseband circuitry 54. The symbols are received by the DSP 56, which rotates the received symbols and/or reference constellation symbols, to generate branch metrics using the hardware accelerators 58 in support of RSSE processing as described above. A memory subsystem 60 and input/output subsystem 62 support the processing core.

An alternative way to the constellation rotation solution discussed above in connection with the computation of the four axis symbols (cosets $A_0$ and $A_2$ in FIG. 5) is to consider these symbols in the form of $a^k=a^l \cdot e^{-j\pi/4}$. Thus, we get $a_x{}^k(s)=a_x{}^l \text{Re}\{e^{-j\pi/4}h_0^*\underline{S}\}$ and $a_y{}^l(s)=a_y{}^l \text{Im}\{e^{-j\pi/4}h_0^*\underline{S}\}$, where $a_x{}^l$ and $a_y{}^l$ are coordinates of a diagonal symbol (in coset $A_1$ and $A_3$ in FIG. 5). In these expressions, $(\pm a_x, \pm a_y)$ properties for axis symbols are assured and therefore butterfly structures can be used. Real and Imaginary parts are modified by the multiplication of the $e^{-j\pi/4}$ coefficient.

Although the Detailed Description of the invention has been directed to certain exemplary embodiments, various modifications of these embodiments, as well as alternative embodiments, will be suggested to those skilled in the art. The invention encompasses any modifications or alternative embodiments that fall within the scope of the Claims.

The invention claimed is:

1. Circuitry for generating a sequence of probable symbols from a sequence of received symbols using Reduced State Sequence Estimation, comprising:

butterfly circuitry for computing terms in butterfly structure of $sm_1'=\min\{sm_1+m,sm_2-m\}$ and $sm_2'=\min\{sm_1-m, sm_2+m\}$; and circuitry for computing multiple path metrics between a first state and a second state responsive to the received symbols and reference constellation symbols and calculating a best path metric at the second state using the output said butterfly circuitry.

2. The circuitry of claim 1 and further comprising circuitry for rotating said received symbols by a predetermined angle.

3. The circuitry of claim 1 and further comprising circuitry for rotating said reference constellation symbols by a predetermined angle.

4. The circuitry of claims 2 or 3 wherein said predetermined angle is $(2k+1)*\pi/8$ with k being an whole number.

5. The circuitry of claim 1 and wherein said reference constellation is an 8-PSK constellation, circuitry for expressing axis symbols of the constellation as a function of diagonal symbols in order to assure symmetrical properties for use of the butterfly circuitry.

6. A method of generating a sequence of probable symbols from a sequence of received symbols using Reduced State Sequence Estimation, comprising the steps of:

computing multiple path metrics between a first state and a second state responsive to said sequence of received symbols using a butterfly circuit for computing $sm_1'=\min\{sm_1+m,sm_2-m\}$; and $sm_2'=\min\{sm_1-m, sm_2+m\}$; and calculating a best path metric at the second state using the output of said butterfly circuit.

7. The method of claim 6 and further comprising the step of rotating said received symbols by a predetermined angle.

8. The method of claim 6 and further comprising the step of rotating said reference constellation symbols by a predetermined angle.

9. The method of claims 7 or 8 wherein said predetermined angle is $(2k+1)*l\pi/8$ with k being a whole number.

10. The method of claim 6 wherein the reference constellation is an 8-PSK constellation, and further comprising the step of expressing axis symbols of the constellation as a function of diagonal symbols in order to assure symmetrical properties for use of the butterfly circuitry.

* * * * *